A. T. HUGHES.
PROTECTOR AND NON-SKIDDING BAND FOR PNEUMATIC TIRES OF WHEELS.
APPLICATION FILED OCT. 18, 1907.
904,435.
Patented Nov. 17, 1908.
2 SHEETS—SHEET 1.
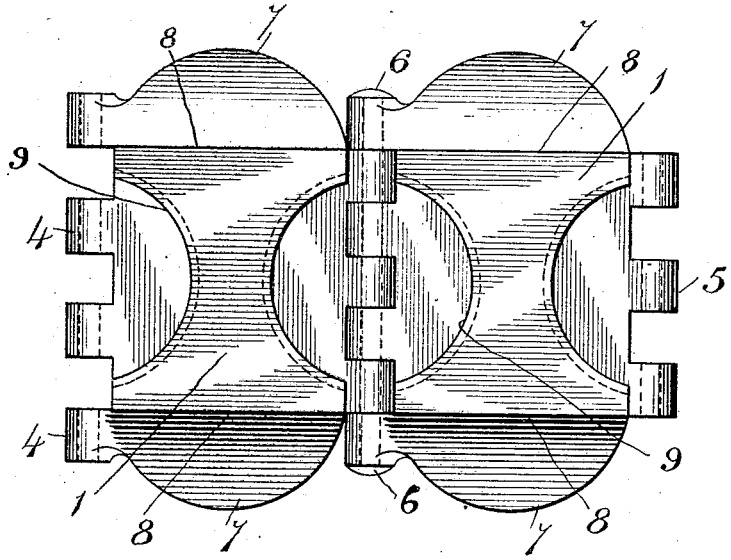
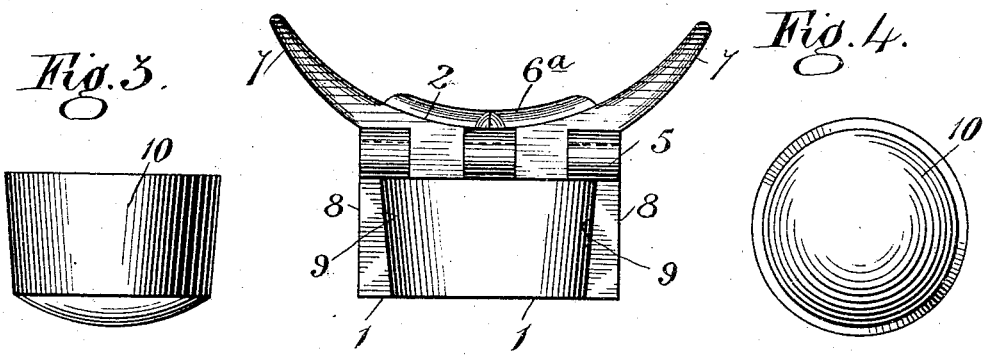
Witnesses:
Inventor
Albert T. Hughes
By
James L. Norris
Atty A. T. HUGHES.
PROTECTOR AND NON-SKIDDING BAND FOR PNEUMATIC TIRES OF WHEELS.
APPLICATION FILED OCT. 18, 1907.

904,435.

Patented Nov. 17, 1908.

2 SHEETS—SHEET 2.

Witnesses:

Inventor
Albert T. Hughes
By
James L. Norris
Atty

UNITED STATES PATENT OFFICE.

ALBERT THOMAS HUGHES, OF LONDON, ENGLAND.

PROTECTOR AND NON-SKIDDING BAND FOR PNEUMATIC TIRES OF WHEELS.

No. 904,435.  Specification of Letters Patent.  Patented Nov. 17, 1908.

Application filed October 18, 1907. Serial No. 398,070.

*To all whom it may concern:*

Be it known that I, ALBERT THOMAS HUGHES, a subject of the King of Great Britain, residing at 10 Furzedown Terrace, Rectory Lane, Tooting, London, England, have invented certain new and useful Improvements in Protectors and Non-Skidding Bands for Pneumatic Tires of Wheels, of which the following is a specification.

The object of this invention is an improved construction of band for pneumatic tires of wheels, which shall not only protect the tire cover from punctures, but shall also prevent the wheel from skidding on greasy surfaces, a perfect grip of the ground or surface being obtained under all circumstances.

For the purpose of my invention, I construct the endless band of a number of segments hinged together, each being of a particular construction, and made of curved formation on the side forming the inner periphery of the band, so as to conform to the shape of the tire tread surface, and to extend some distance down the sides of the tire.

My invention will be clearly understood from the following description aided by the accompanying drawings in which:—

Figure 5:
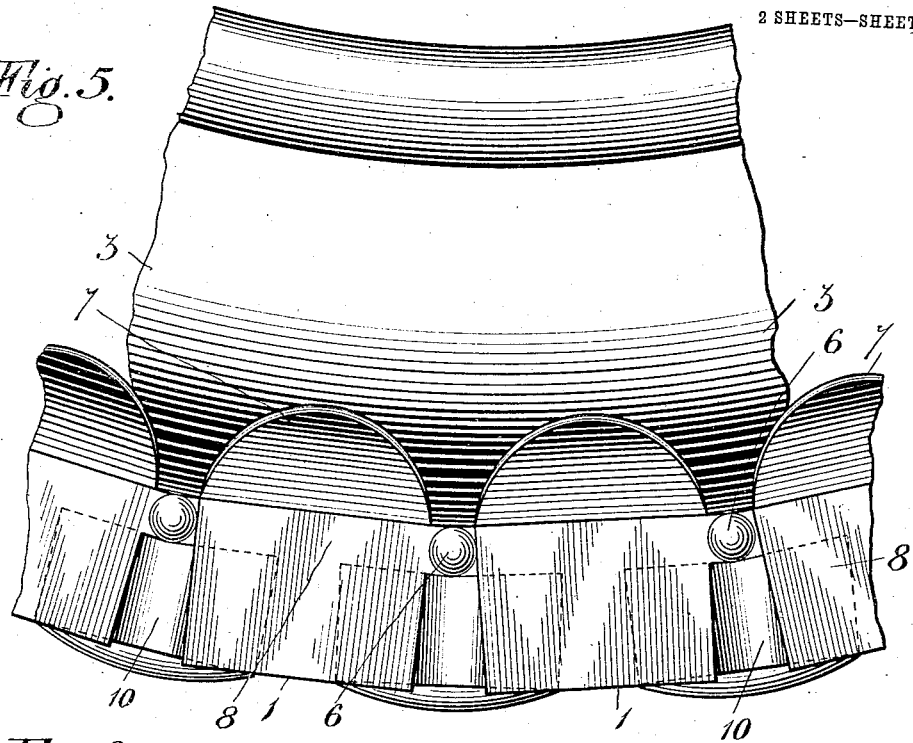
Figure 6:
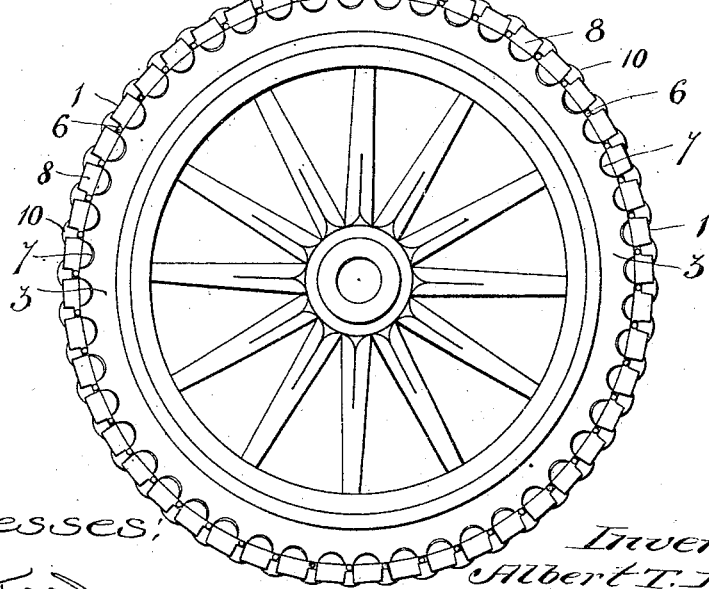

Figure 1. is a top plan view of two segments hinged together. Fig. 2. is an end elevation of a segment. Fig. 3. is a side elevation of a rubber plug and Fig. 4. a plan of same. Fig. 5. is side elevation of portion of a tire showing the segments in position, and with the rubber plugs applied. Fig. 6. is a side elevation of a complete wheel.

Each segment 1 is made of metal or other suitable material by casting or stamping, and is curved at its base 2 to conform to the shape of the tire 3, so as to extend partly down the sides thereof. Each segment is provided with a series of tubes 4 and 5, the tubes 4 of one section extending between the ends of the tubes 5 of an adjoining section. A pin 6 extending through said tubes forms a hinge joint between the several segments, thus forming an endless band in which the segments are free to move with respect to one another during the travel of the wheel. The series of tubes 4, 5, may project from he inner faces or edges of the segments, so as to become somewhat embedded in the tire to prevent creeping of the band, or I may provide ribs 6ª on the inner sides of the segments for that purpose.

The outer portion 7 of each segment 1 projects beyond the sides 8, and each end near the joint is provided with a dovetail recess 9, but such ends, when the segments 1 are joined up, are at a distance from each other, so as to allow of movement of the segments 1 as seen in Fig. 1. In these dovetail recesses, when the segments are joined up, I fit dovetail plugs 10 of india rubber, the faces of which project beyond the surface as at Fig. 5, so as to form a number of studs around the surface. The band encircles the tire, and is held on to the tire by the inflation of same, or otherwise.

In action, the weight of the vehicle causes the segments 1 next the ground, to move inwards towards each other, and in consequence, the ends of the segments will squeeze the rubber plugs 10, and tend to force the exposed surface further outwards, and in consequence of the weight of the vehicle, this exposed surface will be flattened to a great degree, and together with the squeezing and the flattening, the rubber plugs 10 will have a suction or gripping action on the road, and prevent side slip, this being assisted by the metal portion of the sections 1 also gripping the road.

What I claim and desire to secure by Letters Patent is:—

A tire protector consisting of a series of circumferentially-arranged hinged tread elements adapted to grip the tire and each having each side thereof provided with a dovetailed recess, whereby the recess of each opposing pair of elements will constitute a dove-tailed socket, and resilient studs mounted in said socket and projecting from the outer faces of the tread elements.

In testimony whereof I have hereunto set my hand in presence of two subscribing witnesses.

ALBERT THOMAS HUGHES.

Witnesses:
PERCY E. MATTOCKS,
F. C. SMITH.